(12) United States Patent
Pawelski et al.

(10) Patent No.: US 9,725,246 B2
(45) Date of Patent: Aug. 8, 2017

(54) FLOW RESTRICTED POSITIONER CONTROL APPARATUS AND METHODS

(71) Applicant: Flexibility Engineering, LLC, Loveland, CO (US)

(72) Inventors: Joseph Pawelski, Loveland, CO (US); Thomas M. Ingraham, Fort Collins, CO (US)

(73) Assignee: Flexibility Engineering, LLC, Loveland, CO (US)

( * ) Notice: Subject to any disclaimer, the term of this patent is extended or adjusted under 35 U.S.C. 154(b) by 0 days.

(21) Appl. No.: 14/853,836

(22) Filed: Sep. 14, 2015

(65) Prior Publication Data

US 2016/0052720 A1 Feb. 25, 2016

Related U.S. Application Data

(63) Continuation-in-part of application No. 13/420,368, filed on Mar. 14, 2012, now Pat. No. 9,133,865, which is a continuation-in-part of application No. 13/417,021, filed on Mar. 9, 2012, now abandoned, which is a continuation of application No. 12/124,033, filed on May 20, 2008, now Pat. No. 8,132,665.

(51) Int. Cl.
*B65G 21/00* (2006.01)
*B65G 21/20* (2006.01)
*F15B 15/14* (2006.01)

(52) U.S. Cl.
CPC ...... *B65G 21/2072* (2013.01); *F15B 15/1404* (2013.01); *F15B 15/1476* (2013.01)

(58) Field of Classification Search
CPC ... F15B 15/1404; F15B 13/04; B65G 21/2072
See application file for complete search history.

(56) References Cited

U.S. PATENT DOCUMENTS

| | | | | |
|---|---|---|---|---|
| 1,329,559 | A | * 2/1920 | Tesla | F15C 1/00 137/842 |
| 1,929,707 | A | * 10/1933 | Mojonnier | B65G 21/2072 198/836.3 |
| 2,095,820 | A | * 10/1937 | Lenz | F16D 33/16 60/39.183 |
| 2,484,603 | A | * 10/1949 | Audemar | B64C 25/22 416/156 |

(Continued)

OTHER PUBLICATIONS

U.S. Appl. No. 14/853,797, filed Sep. 14, 2015. First Named Inventor: Joseph Pawelski.

(Continued)

*Primary Examiner* — Joseph Dillon, Jr.
(74) *Attorney, Agent, or Firm* — Santangelo Law Offices, PC

(57) ABSTRACT

Particular embodiments of the inventive technology disclosed herein relate to the use of a dynamic valve to reduce motion caused by impulse force applied to a positioned component. Typically, the inventive technology finds application in an internally pressurized positioning system. At times, use of the inventive technology may lead to cost savings by, e.g., allowing for the use of smaller diameter positioner actuators and/or a reduced internal pressure.

17 Claims, 12 Drawing Sheets

(56) References Cited

U.S. PATENT DOCUMENTS

| | | | |
|---|---|---|---|
| 2,603,340 A * | 7/1952 | Warren et al. | B65G 47/681 198/418.6 |
| 2,634,167 A * | 4/1953 | Bible, Jr. | A46B 3/16 15/193 |
| 2,799,414 A * | 7/1957 | Streckfuss | B65B 21/18 198/429 |
| 3,367,534 A * | 2/1968 | Carter, III | B65B 43/42 198/397.06 |
| 3,592,002 A | 7/1971 | Alduk | |
| 3,612,297 A | 10/1971 | Lapostolet | |
| 3,647,051 A | 3/1972 | Didas | |
| 3,687,059 A | 8/1972 | Plattner et al. | |
| 3,776,350 A | 12/1973 | Tice | |
| 3,890,011 A * | 6/1975 | Futer | B65G 51/03 221/236 |
| 3,897,877 A | 8/1975 | VanderMeer et al. | |
| 3,918,598 A | 11/1975 | VanderMeer et al. | |
| 4,154,347 A * | 5/1979 | Vander Meer | B65G 57/035 414/789.5 |
| 4,251,979 A | 2/1981 | Horigome et al. | |
| 4,259,826 A | 4/1981 | Campbell | |
| 4,264,002 A | 4/1981 | Van Der Schie | |
| 4,277,932 A | 7/1981 | Campbell | |
| 4,401,205 A | 8/1983 | Komossa et al. | |
| 4,406,359 A | 9/1983 | Cole et al. | |
| 4,500,229 A | 2/1985 | Cole et al. | |
| 4,515,503 A | 5/1985 | Snowdon | |
| 4,715,748 A | 12/1987 | Krambrock | |
| 4,747,252 A | 5/1988 | Kapke | |
| 4,753,564 A | 6/1988 | Pearce et al. | |
| 4,759,673 A | 7/1988 | Pearce et al. | |
| 4,802,571 A | 2/1989 | Born et al. | |
| 4,809,965 A | 3/1989 | VanderMeer et al. | |
| 4,828,434 A | 5/1989 | Fairman et al. | |
| 4,829,743 A | 5/1989 | Kapke | |
| 4,829,744 A | 5/1989 | Kapke | |
| 4,843,797 A | 7/1989 | Butterly, Jr. et al. | |
| 4,887,719 A | 12/1989 | Kapke | |
| 4,909,676 A | 3/1990 | Heep et al. | |
| 4,934,508 A | 6/1990 | VanderMeer et al. | |
| 4,990,034 A | 2/1991 | Kapke et al. | |
| 5,004,400 A | 4/1991 | Handke | |
| 5,071,289 A | 12/1991 | Spivak | |
| 5,074,608 A | 12/1991 | Gabriel | |
| 5,099,979 A | 3/1992 | Kehrel | |
| 5,145,253 A | 9/1992 | Paul et al. | |
| 5,161,919 A | 11/1992 | Smith et al. | |
| 5,206,039 A | 4/1993 | Valyi | |
| 5,211,280 A * | 5/1993 | Houde | B65G 21/2072 198/836.3 |
| 5,222,840 A | 6/1993 | Ingraham et al. | |
| 5,237,906 A * | 8/1993 | Raymond | F15B 13/0814 91/291 |
| 5,271,709 A | 12/1993 | VanderMeer et al. | |
| 5,273,152 A | 12/1993 | Brun | |
| 5,310,307 A | 5/1994 | VanderMeer et al. | |
| 5,320,457 A | 6/1994 | VanderMeer et al. | |
| 5,322,160 A | 6/1994 | Markiewicz et al. | |
| 5,407,305 A | 4/1995 | Wallace | |
| 5,437,533 A | 8/1995 | VanderMeer et al. | |
| 5,492,218 A | 2/1996 | Falkowski | |
| 5,494,150 A | 2/1996 | McDonell et al. | |
| 5,501,552 A | 3/1996 | Simkowski | |
| 5,501,553 A | 3/1996 | Simkowski | |
| 5,522,692 A | 6/1996 | Simkowski | |
| 5,542,789 A | 8/1996 | Aidlin | |
| 5,555,700 A * | 9/1996 | Marti | B65B 21/04 198/418.6 |
| 5,558,200 A | 9/1996 | Whitby et al. | |
| 5,566,816 A | 10/1996 | Gross et al. | |
| 5,570,977 A | 11/1996 | Simkowski et al. | |
| 5,630,679 A | 5/1997 | Simkowski et al. | |
| 5,682,976 A | 11/1997 | Jorgensen | |
| 5,699,896 A | 12/1997 | Spada et al. | |
| 5,716,189 A * | 2/1998 | Winski | B65G 57/245 414/799 |
| 5,733,090 A | 3/1998 | Fuke et al. | |
| 5,733,100 A | 3/1998 | Slat et al. | |
| 5,746,572 A | 5/1998 | Winski | |
| 5,762,794 A | 6/1998 | Simkowski et al. | |
| 5,794,790 A | 8/1998 | Bonnet | |
| 5,803,703 A | 9/1998 | Winski | |
| 5,819,907 A | 10/1998 | Simkowski | |
| 5,819,911 A | 10/1998 | Ledingham | |
| 5,842,818 A | 12/1998 | Simkowski | |
| 5,927,480 A | 7/1999 | McCaffrey et al. | |
| 5,961,275 A | 10/1999 | Winski et al. | |
| 5,967,295 A | 10/1999 | Ledingham | |
| 6,000,884 A | 12/1999 | Ingraham | |
| 6,003,662 A | 12/1999 | McCaffrey et al. | |
| 6,135,271 A | 10/2000 | Ledingham | |
| 6,190,094 B1 | 2/2001 | Rediess et al. | |
| 6,196,788 B1 | 3/2001 | Talbot et al. | |
| 6,209,707 B1 | 4/2001 | Ronchi | |
| 6,241,072 B1 | 6/2001 | Ingraham | |
| 6,305,528 B1 | 10/2001 | Leonard | |
| 6,309,144 B1 | 10/2001 | Ingraham | |
| 6,318,935 B1 | 11/2001 | Ouellette | |
| 6,332,740 B1 | 12/2001 | Bernard et al. | |
| 6,389,341 B1 * | 5/2002 | Davis | B60G 17/0152 188/266.5 |
| 6,408,740 B1 | 6/2002 | Holt et al. | |
| 6,431,817 B1 | 8/2002 | Simkowski | |
| 6,514,015 B1 | 2/2003 | Trenel et al. | |
| 6,533,110 B1 | 3/2003 | Ledingham | |
| 6,578,702 B2 | 6/2003 | Falkowski | |
| 6,589,008 B1 | 7/2003 | Ingraham | |
| 6,685,401 B1 | 2/2004 | de Almeida Rodrigues et al. | |
| 6,827,203 B2 | 12/2004 | Andreoli et al. | |
| 6,827,205 B2 | 12/2004 | Ledingham | |
| 6,886,841 B2 * | 5/2005 | Coombs | B60G 7/001 280/124.157 |
| 6,957,533 B1 * | 10/2005 | Olsson | E05F 3/102 60/545 |
| 7,085,636 B2 * | 8/2006 | Song | B60G 17/0152 280/5.512 |
| 7,104,180 B2 * | 9/2006 | Hall | B60G 17/0152 91/422 |
| 7,152,405 B2 * | 12/2006 | Friedsam | B60T 11/20 60/562 |
| 7,210,572 B2 | 5/2007 | Ingraham | |
| 7,717,254 B2 | 5/2010 | Brackley et al. | |
| 7,721,876 B2 * | 5/2010 | Hartness | B65G 21/2072 198/836.3 |
| 7,735,636 B2 | 6/2010 | Lundberg | |
| 7,789,398 B2 | 9/2010 | Munday et al. | |
| 7,815,041 B2 | 10/2010 | Guenther | |
| 7,887,064 B2 * | 2/2011 | Inoue | B60G 11/27 280/5.5 |
| 7,891,484 B2 * | 2/2011 | Ranger | B65G 21/2072 198/836.1 |
| 8,132,665 B2 | 3/2012 | Pawelski | |
| 8,931,631 B2 * | 1/2015 | Vasse | B65G 21/2072 198/836.1 |
| 9,133,865 B2 | 9/2015 | Pawelski | |
| 2002/0174766 A1 | 11/2002 | Norton | |
| 2002/0192038 A1 | 12/2002 | Trenel et al. | |
| 2003/0164280 A1 | 9/2003 | Delaporte et al. | |
| 2003/0205447 A1 | 11/2003 | Ledingham | |
| 2007/0039458 A1 | 2/2007 | Hoshino | |
| 2007/0095247 A1 | 5/2007 | Ingraham | |
| 2009/0288725 A1 | 11/2009 | Pawelski | |
| 2011/0187065 A1 | 8/2011 | Van Der Knaap et al. | |
| 2015/0308465 A1 | 10/2015 | Krondorfer | |
| 2017/0074294 A1 | 3/2017 | Paweski et al. | |

OTHER PUBLICATIONS

U.S. Appl. No. 14/853,797, filed Sep. 14, 2015. First Named Inventor: Joseph Pawelski. Non-final Office Action dated Dec. 18, 2015. 22 pages.

(56) References Cited

OTHER PUBLICATIONS

U.S. Appl. No. 14/853,797, filed Sep. 14, 2015. First Named Inventor: Joseph Pawelski. Response lated Mar. 18, 2016 to Non-final Office Action dated Dec. 18, 2015. 17 pages.
U.S. Appl. No. 13/420,368, filed Mar. 14, 2012. First Named Inventor: Joseph Pawelski.
U.S. Appl. No. 13/417,021, filed Mar. 9, 2012. First Named Inventor: Joseph Pawelski.
U.S. Appl. No. 14/853,797, filed Sep. 14, 2016. First named inventor: Joseph Pawelski. Office Action dated Jul. 7, 2016. 23 pages.
U.S. Appl. No. 14/853,797, filed Sep. 14, 2015. First Named Inventor Joseph Pawelski. Advisory Action dated Oct. 20, 2016.
U.S. Appl. No. 14/853,797, filed Sep. 14, 2015. First Named Inventor Joseph Pawelski. Notice of Allowance dated Mar. 3, 2017. 5 pages.
U.S. Appl. No. 14/853,797, filed Sep. 14, 2015. First Named Inventor Joseph Pawelski. Non Final Office Action dated Jan. 17, 2017. 13 pages.

* cited by examiner

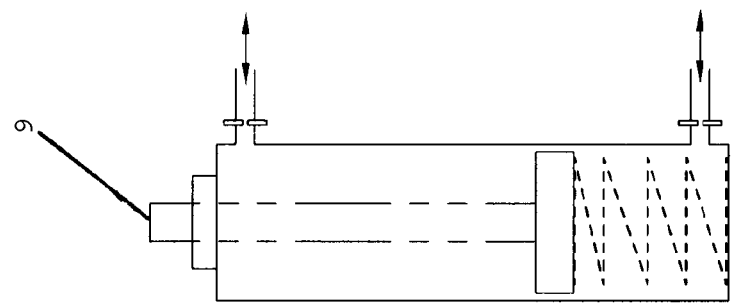
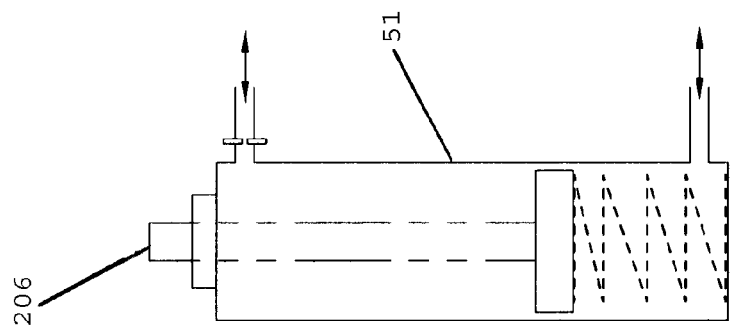
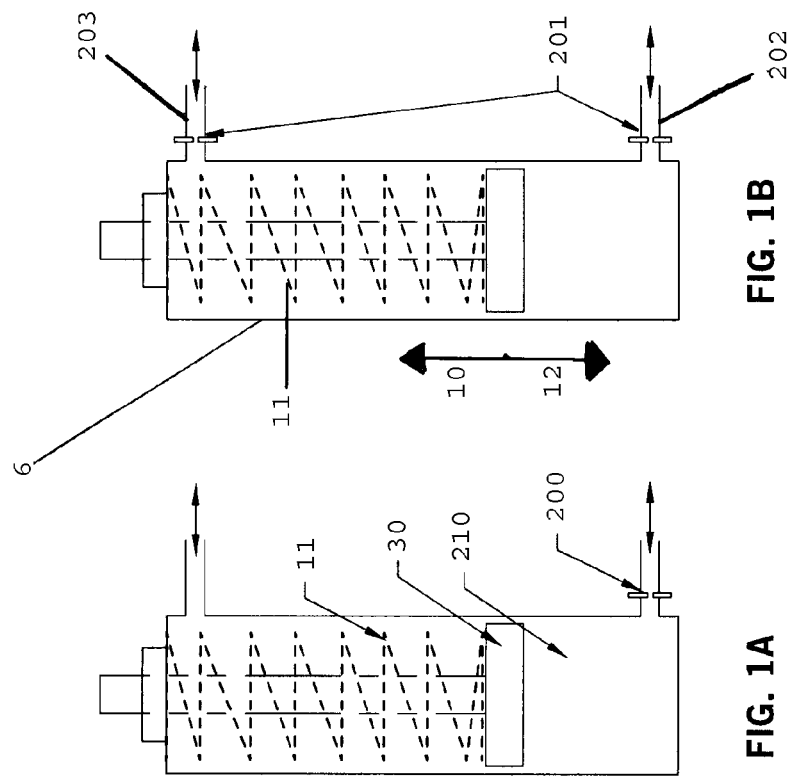
FIG. 1A  FIG. 1B  FIG. 1C  FIG. 1D

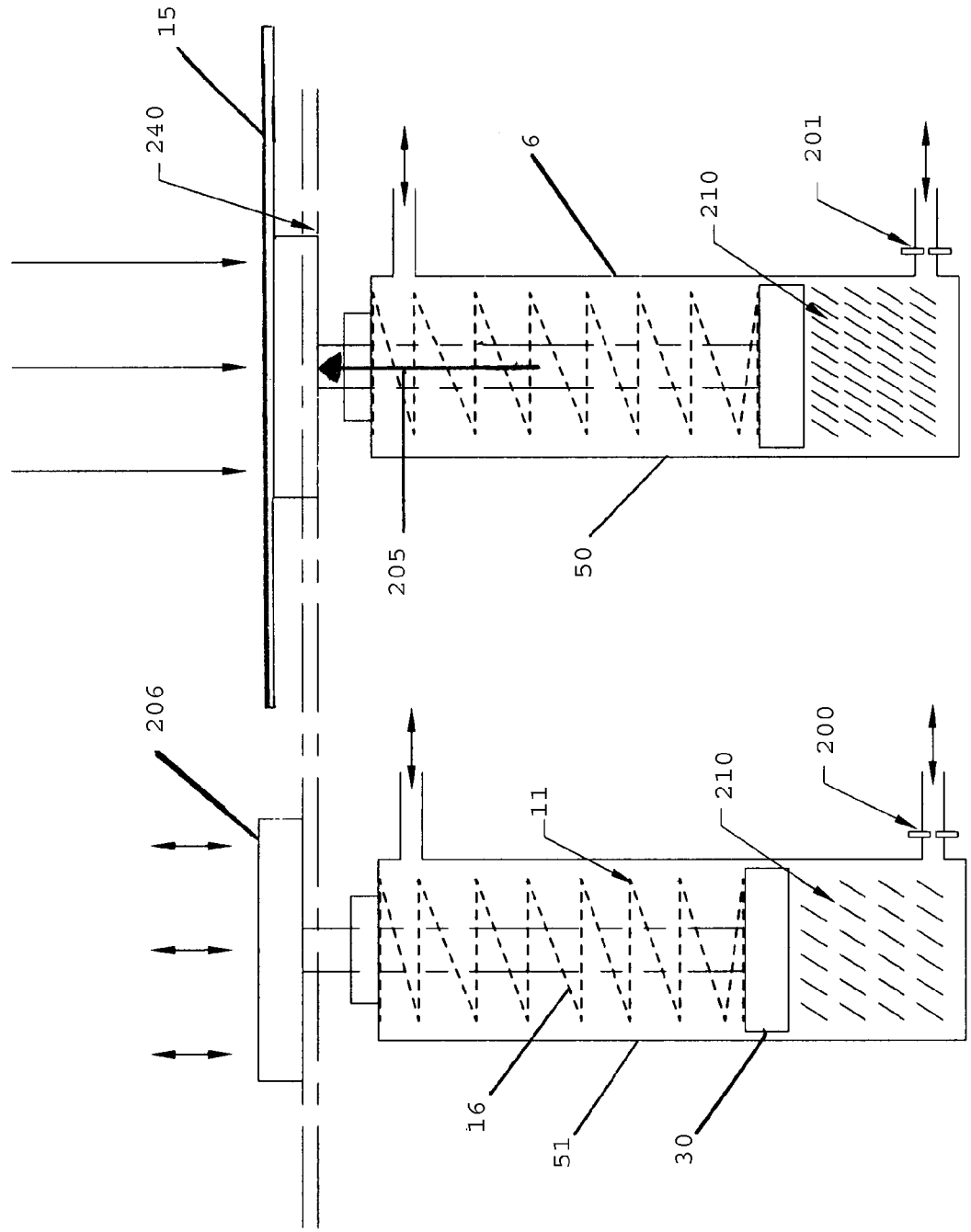

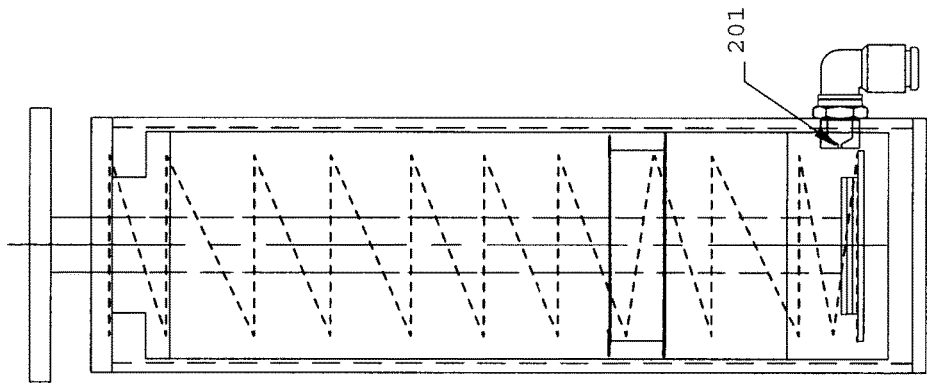
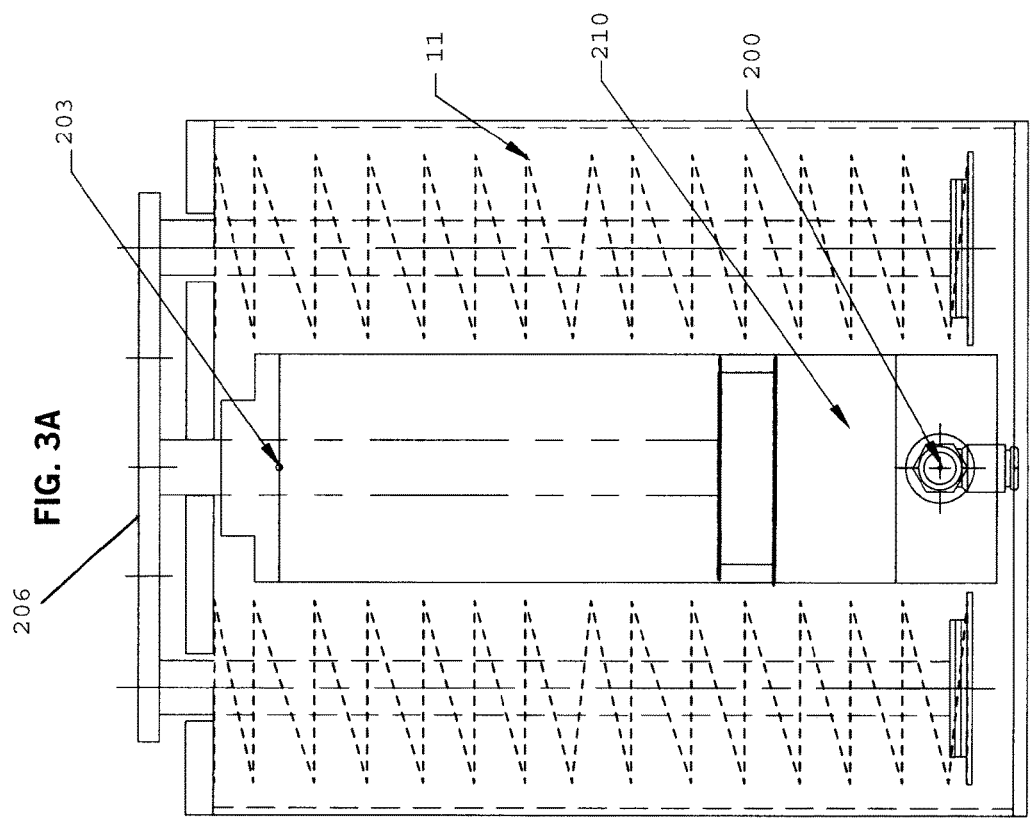

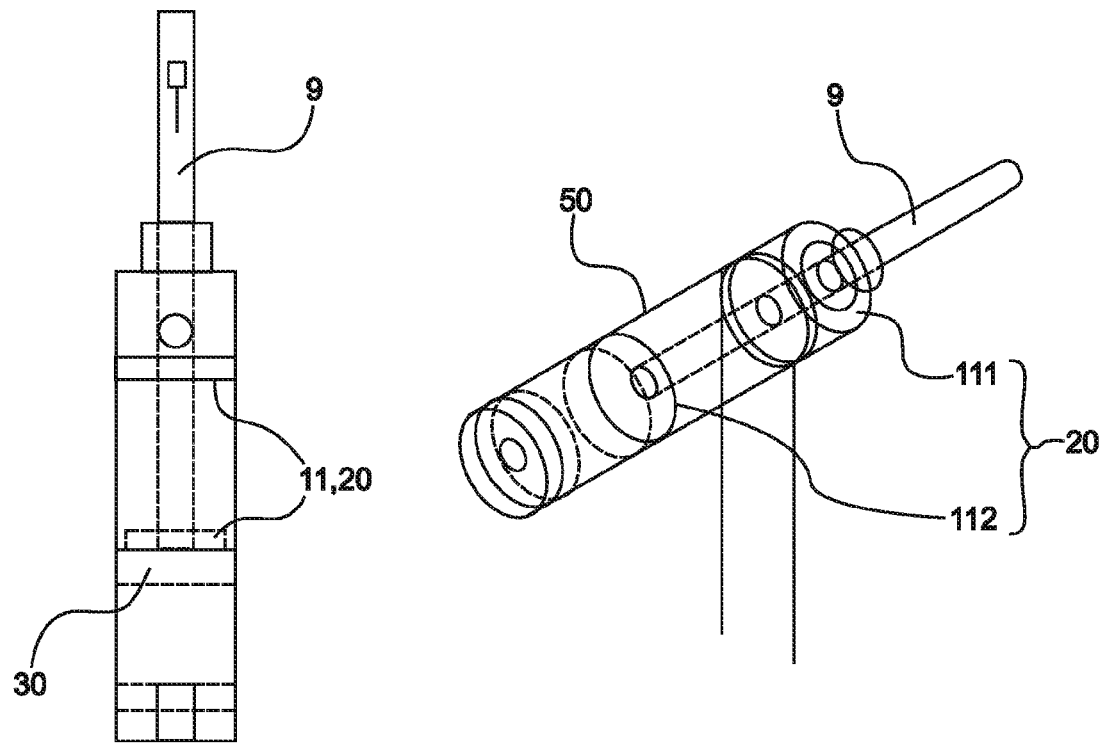
FIG. 11A
FIG. 11B
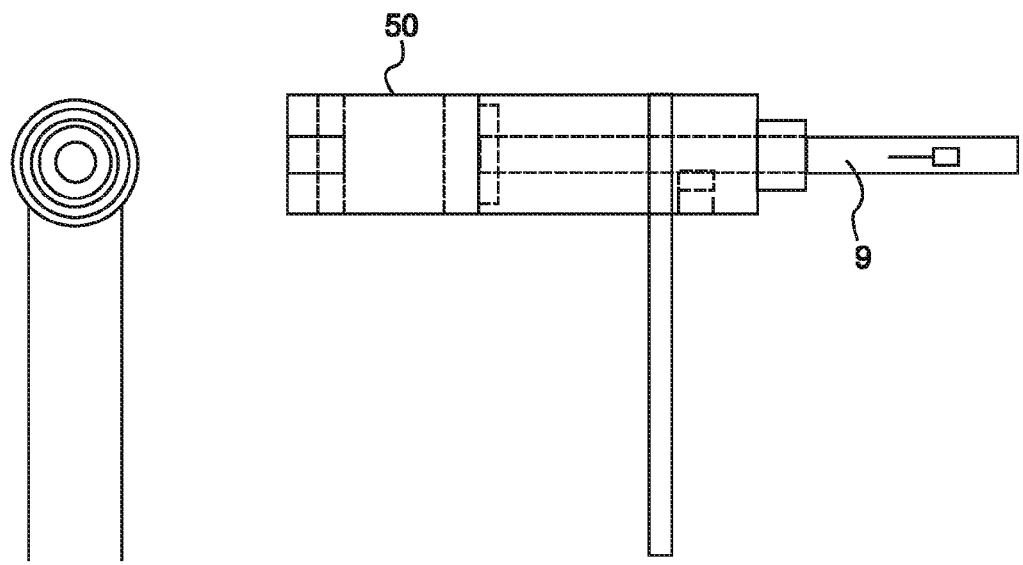
FIG. 11C
FIG. 11D

FLOW RESTRICTED POSITIONER CONTROL APPARATUS AND METHODS

CROSS-REFERENCE TO RELATED APPLICATIONS

This application is a continuation-in-part of, and claims benefit of and priority to U.S. patent application Ser. No. 13/420,368 (published as US 2012/0168284 A1 on Jul. 5, 2012 and issued as U.S. Pat. No. 9,133,865 on Sep. 15, 2015), filed Mar. 14, 2012, said application itself a continuation-in part of U.S. patent application Ser. No. 13/417,021, filed Mar. 9, 2012, now abandoned, which itself is a continuation of, and claims benefit of and priority to, U.S. patent application Ser. No. 12/124,033, filed May 20, 2008 (published as US 2009/0288725 A1 on Nov. 26, 2009 and issued as U.S. Pat. No. 8,132,665 on Mar. 13, 2012), each of said applications hereby incorporated herein by reference in their entirety.

BACKGROUND OF THE INVENTION

The need to accurately position—and reposition as a new application may require—one or more items for proper operation of systems and apparatus has been known in several industries for years. Equally familiar to designers of such systems are the consequences of physical impacts (whether abrupt or otherwise) with positioned components (or, more generally, components that are capable of receiving an impact force) such as bottle conveyance system side guides and the disturbance to the desired position of that component (and perhaps to the items such as bottles that they position) that they cause. Embodiments of the inventive technology disclosed herein seek to minimize such consequences, preferably in a less expensive but still reliable manner as compared with conventional techniques.

Perhaps the most well known such position control apparatus is a side guide position control apparatus, which may find application in the bottling industry to maintain proper position of containers (bottles or cans, as but two examples) as they travel along a conveyor during processing (filling, capping, etc.). A similar type of position control apparatus may operate as part of a palletizing system to maintain the proper position of pallets as they travel along a conveyor, whether for pallet manufacture or pallet loading. Position control apparatus may also find application as part of a differential valve controller, an HVAC mixing control system (as a substitute for expensive blowers) and a programmable vehicle suspension system (where ground clearance is controlled), as but three of many examples. Indeed, the position control apparatus may be used to control the position of components of a system, where such components may benefit from repeated monitoring and adjustment to assure proper positioning (e.g., during a single "run" on a single bottle size) and/or, particularly in systems that are usable to process differently sized items (e.g., bottles of different sizes), where components need to have their position adjusted before a specific "run" (e.g., on a different bottle size), depending on the size of an item processed during that "run."

However, whether it be a mis-oriented bottle on a conveyor that impacts a side guide, a human jumping on a conveyor belt, a gust of wind on a solar panel, or any of the myriad ways in which an impulse force can be applied to a positioned component (such as a positioner that itself positions items), such positioned components are vulnerable to impulse forces that can cause significant deviation from their intended position, whether for a short period of time or for longer periods of time, and can compromise system operation, efficiency, operational safety, operational success, etc.

Conventional ways of mitigating this problem, e.g., increasing internal pressure of pressurized systems and/or increasing size of cylinder bores in piston-based systems, while perhaps successful in adding some rigidity to positioned components in response to impulse forces, also may be expensive, perhaps prohibitively so. Particular embodiments of the inventive technology seek to improve mitigation of effects of the impulse force by, e.g., improving the rigidity of the component when it receives the impulse, and/or reduce costs (as compared with conventional systems) associated with providing sufficient rigidity in response to the force. Indeed, there have been attempts in the past to provide adequate rigidity in response to impulses by, e.g., increasing internal pressure of the internally pressurized system with a compressor, but such efforts may be prohibitively costly and/or simply do not afford all the benefits afforded by the inventive technology.

SUMMARY OF THE INVENTION

Particular embodiments of the inventive technology involve the use of one or more dynamic valves in order to provide rigidity in response to impulse forces received by positioned components. Such rigidity may result from a force in opposition to the impulse force; this opposition force may be attributed, at least in part, to the dynamic valve and the restriction to flow (typically of pressurized fluid) that it causes.

As mentioned, advantages of certain embodiments of the inventive technology relate to reduced cost, and perhaps decreased complexity and/or improved performance (e.g., improved rigidity and reduced motion of positioned components in response to impulse force). Of course, these and other advantages of the inventive technology may be as more particularly disclosed in the remainder of the specification, including the claims.

BRIEF DESCRIPTION OF THE FIGURES

FIGS. 1A-D shows various embodiments of the inventive technology, where the dynamic valve applied to the positioner control apparatus as shown is an orifice. In such embodiments, the biaser is internal of the actuator. Note that in this (and in all figures presented herein), the dynamic valve is considered a part of the positioner actuator.

FIG. 2A and FIG. 2B show two states—undisturbed or steady state condition (FIG. 2A) and disturbed or impulse condition (FIG. 2B)—of the embodiment of FIG. 1A. In FIG. 2A, the pressure below the piston is the control pressure. FIG. 2B shows a minimal displacement of the positioner as a result of the dynamic valve used in the control pressure port (pressure below the piston is greater than control pressure); displacement may be (roughly) proportional to the increase in pressure in the cylinder below the piston and/or the volume change in the displacement volume below the piston.

FIGS. 3A and 3B show views of an embodiment of the dynamic valve based technology as exhibited as part of an external biaser apparatus (where the biaser is external of the actuator, a piston in cylinder arrangement). FIG. 3A shows a front (transparent) view while FIG. 3B shows a side (transparent) view. In FIGS. 3A and 3B, a vent hole is located at the top of the cylinder and a control pressure port (in which the orifice type dynamic valve is established) is a type of air fitting located at the bottom of the cylinder.

FIG. 11A shows a top view of components of an embodiment of a position control apparatus, of which an orifice(s) may form part, with electromagnetic biasers; FIG. 11B shows a perspective view of components of an embodiment of the position control apparatus with electromagnetic biasers; FIG. 11C shows a front view of components of an embodiment of the position control apparatus with electromagnetic biasers; and FIG. 11D shows a side view of components of an embodiment of the position control apparatus with electromagnetic biasers (FIGS. 7A, B and D show a transparent cylinder).

DISCLOSURE OF THE PREFERRED EMBODIMENTS

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Particular embodiments of the inventive technology may be described as a system comprising: a position control apparatus 6 that controls the position of at least one component capable of receiving an impulse force 206, the position control apparatus comprising internally pressurized componentry. Such componentry may include, for example, an actuator, such as including a piston 30, and pressurized tubing or conduit, even where part of that componentry (e.g., an actuator) is not internally pressurized by a control pressure that is pressurized at an internal fluidic pressure. The inventive technology, in embodiments, may further include at least one dynamic valve 200 configured to oppose motion of the at least one component that is induced (i.e., the motion is induced) by the impulse force. A dynamic valve that is established in any position, location or orientation relative to other system componentry such that it provides the desired effect (of opposing motion as indicated) is deemed one that is configured to oppose such motion (see, e.g., the figures). In certain embodiments, the dynamic valve is configured (e.g., positioned or located) so as to restrict one or both of: outflow (exhaust) from a positioner actuator during application of an impulse force, and inflow into a positioner actuator during application of that force (at times, as explained herein, the greatest opposition force will result from a dynamic valve that is configured to restrict outflow from an actuator during application of the impulse force).

Figure 4:
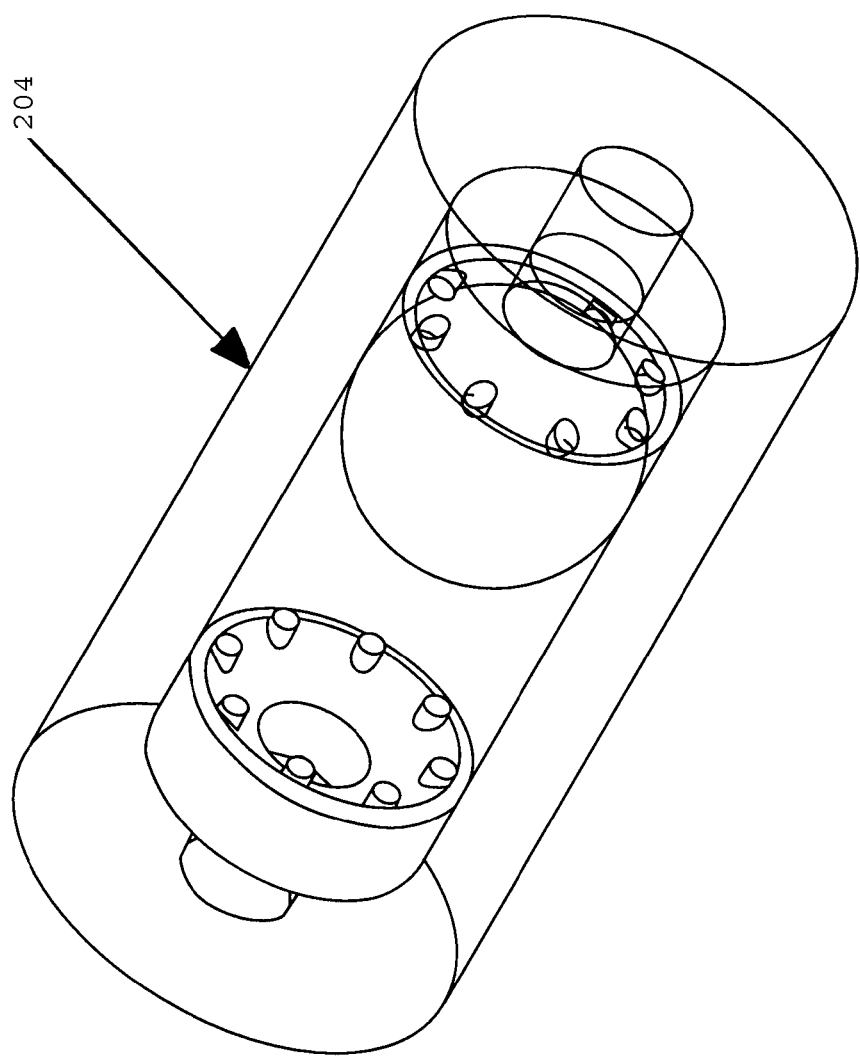
FIG. 4 shows one of several possible dynamic valves that may be used in embodiments of the inventive technology. Shown in this figure is a ball type dynamic valve. It is a modified check valve with a scalloped elastic seal. The scallops allow low flows to pass by unrestricted, but higher flows cause the ball to compress the scallops, forming a seal that blocks flow.
Figure 5:
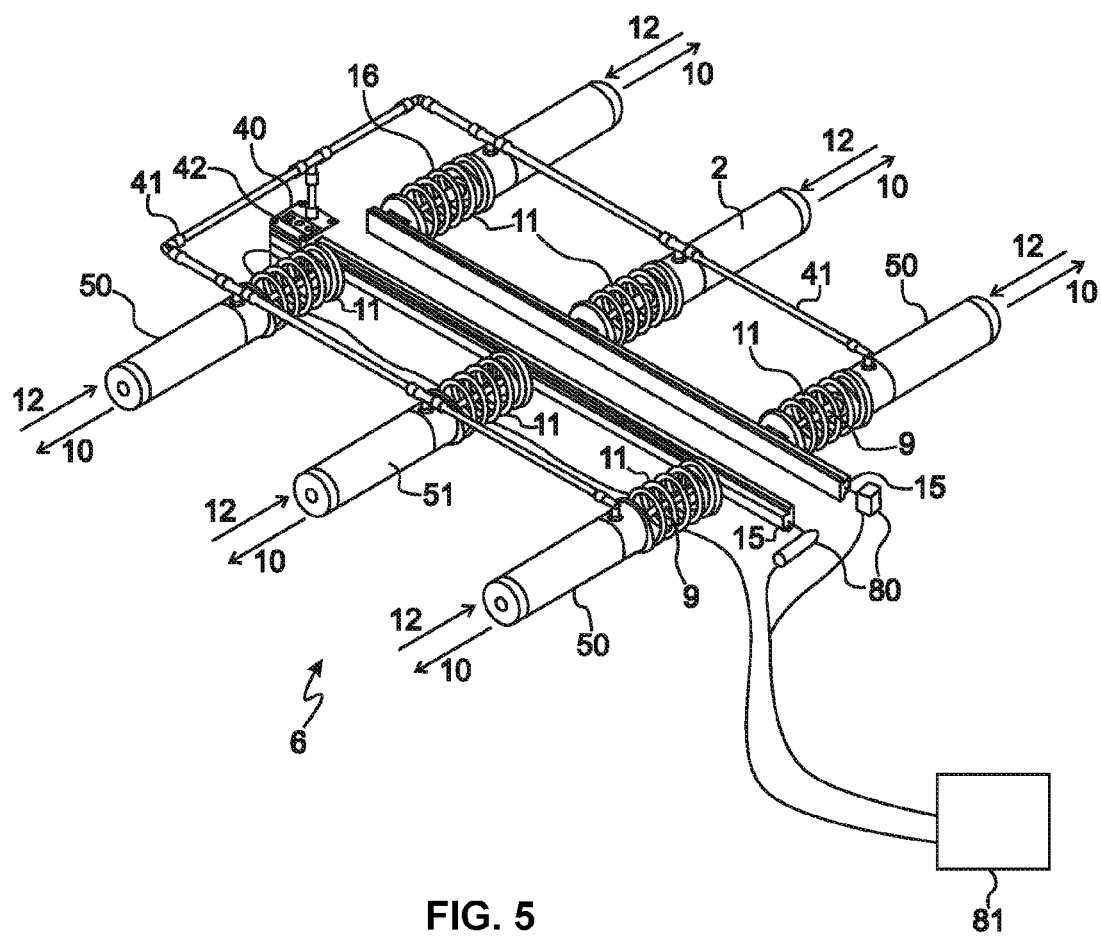
FIG. 5 shows a perspective view of an embodiment of a position control apparatus (without showing an orifice; biasers are external helical springs), of which an orifice(s) may form a part.
Figure 6:
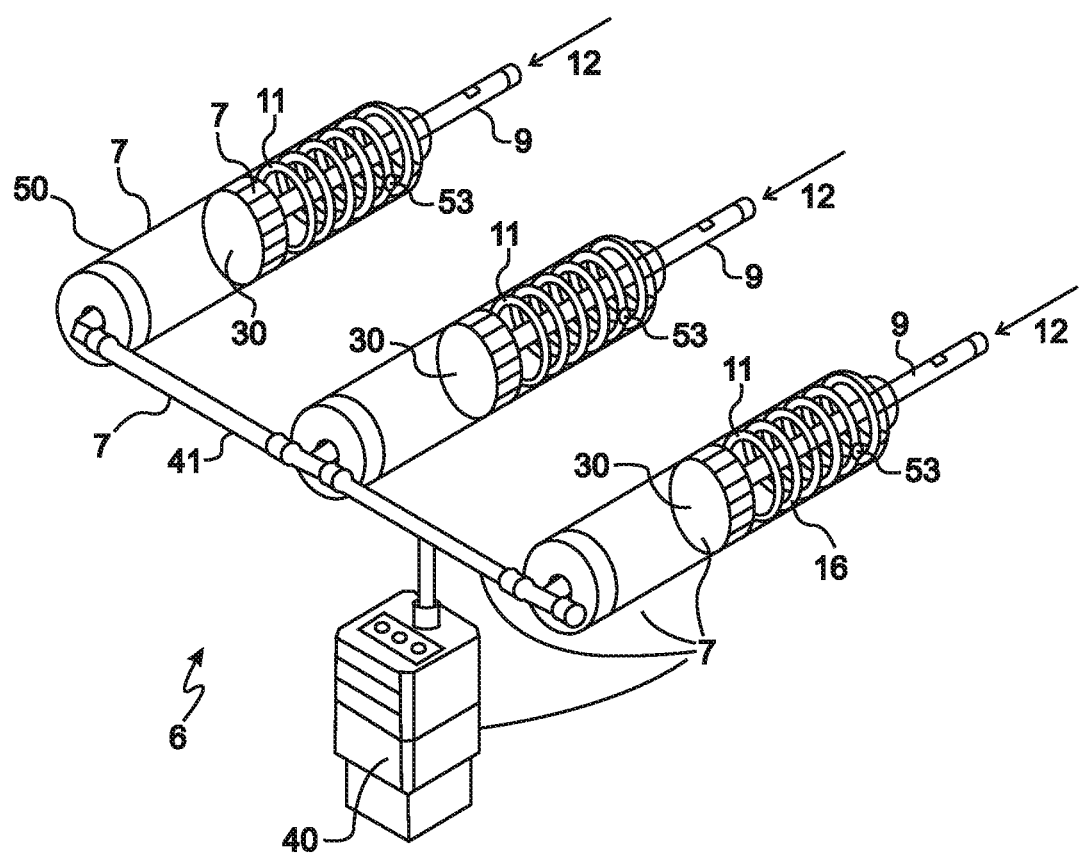
FIG. 6 shows a perspective view of an embodiment of a position control apparatus of which an orifice(s) may form part (biasers are internal helical springs), where the cylinders are transparent to show internal components.
Figure 7:
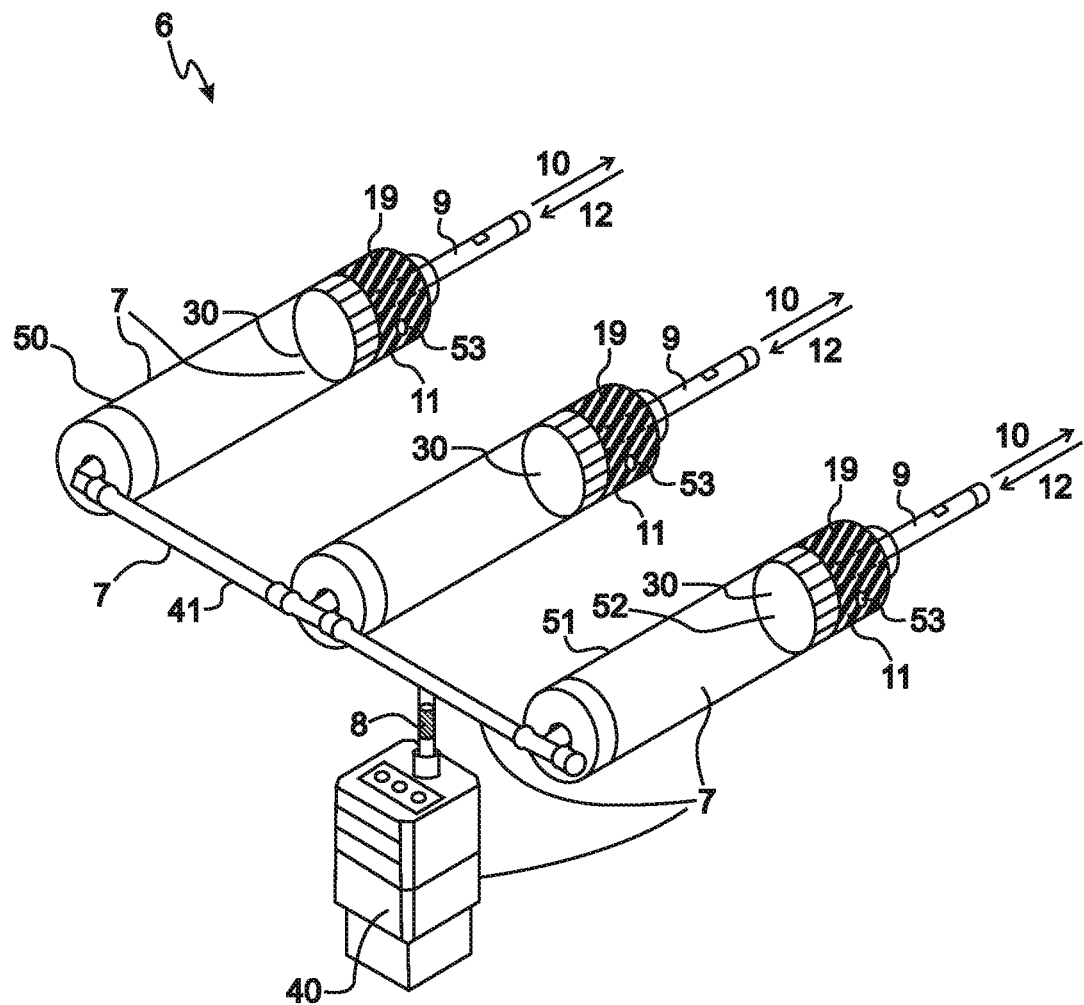
FIG. 7 shows a perspective view of an embodiment of a position control apparatus of which an orifice(s) may form part (with an elastic material serving as biasers), where the cylinders are transparent to show internal components.
Figure 8:
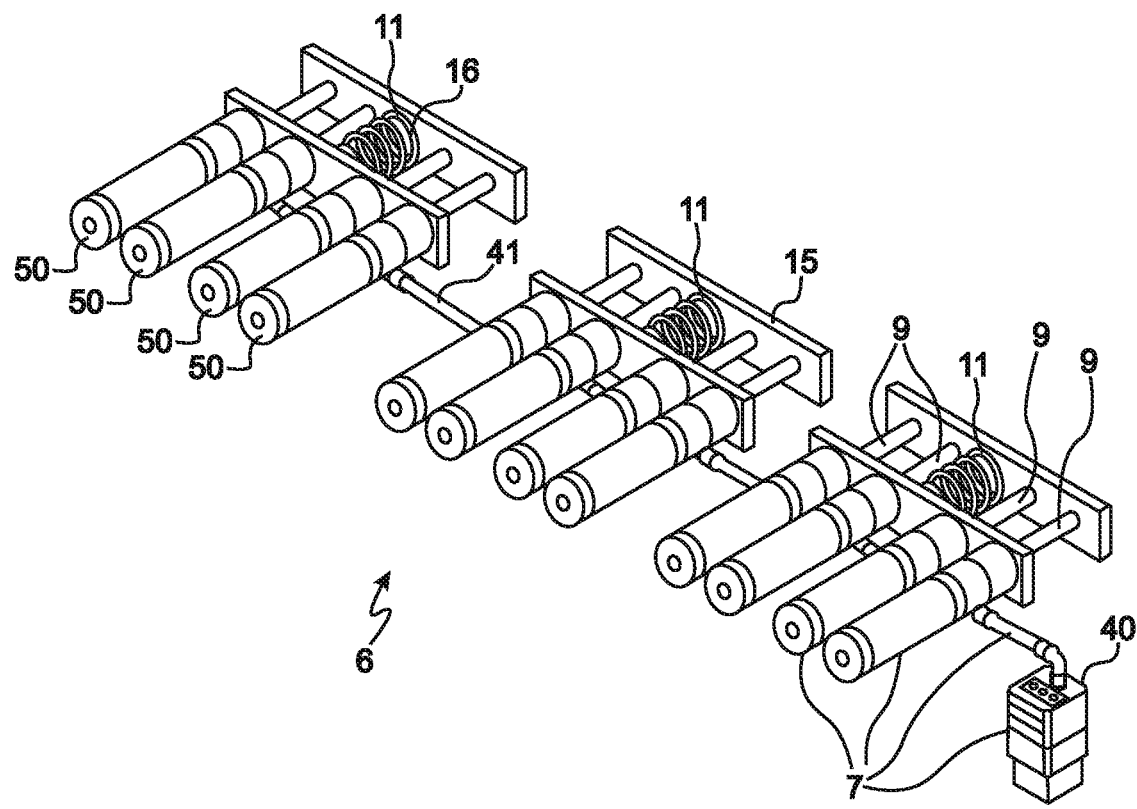
FIG. 8 shows a perspective view of an embodiment of a position control apparatus of which an orifice(s) may form part (with helical springs as biasers), with pistons shown in solid line for clarity (part of positioner within cylinder not shown).
Figure 9:
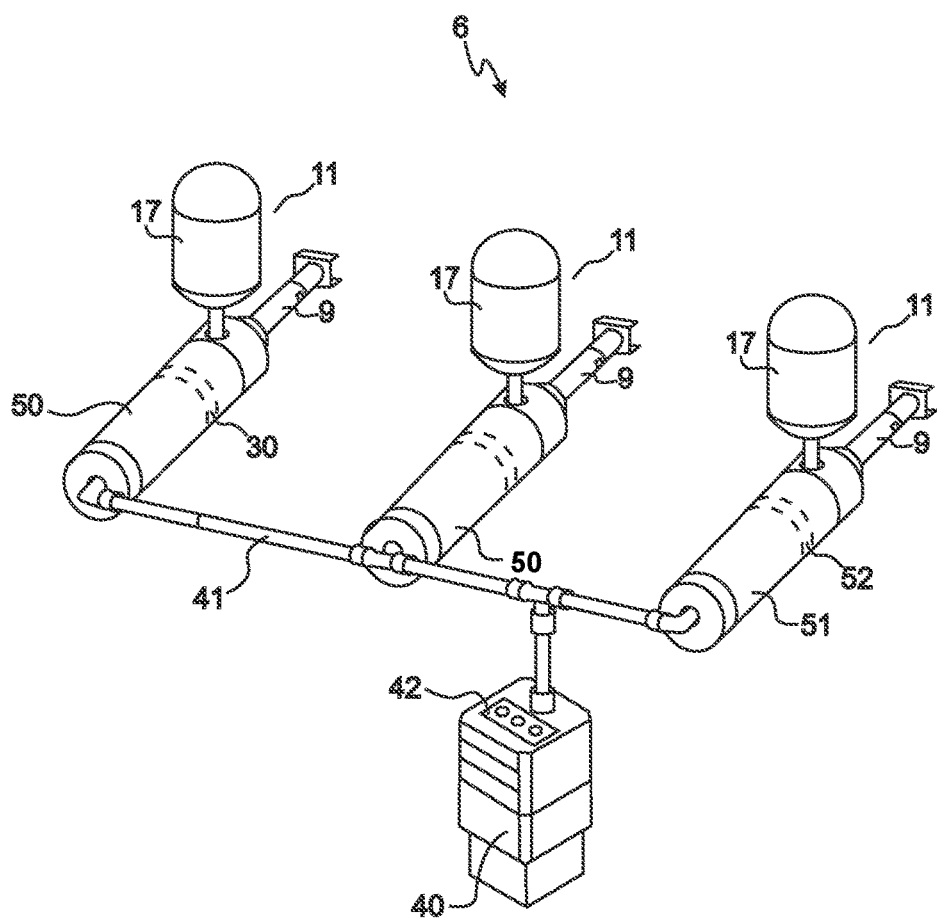
FIG. 9 shows an embodiment of a position control apparatus, of which an orifice(s) may form part, with contained compressible fluid as biasers (pistons shown in dashed line; part of positioner within cylinder not shown).
Figure 10:
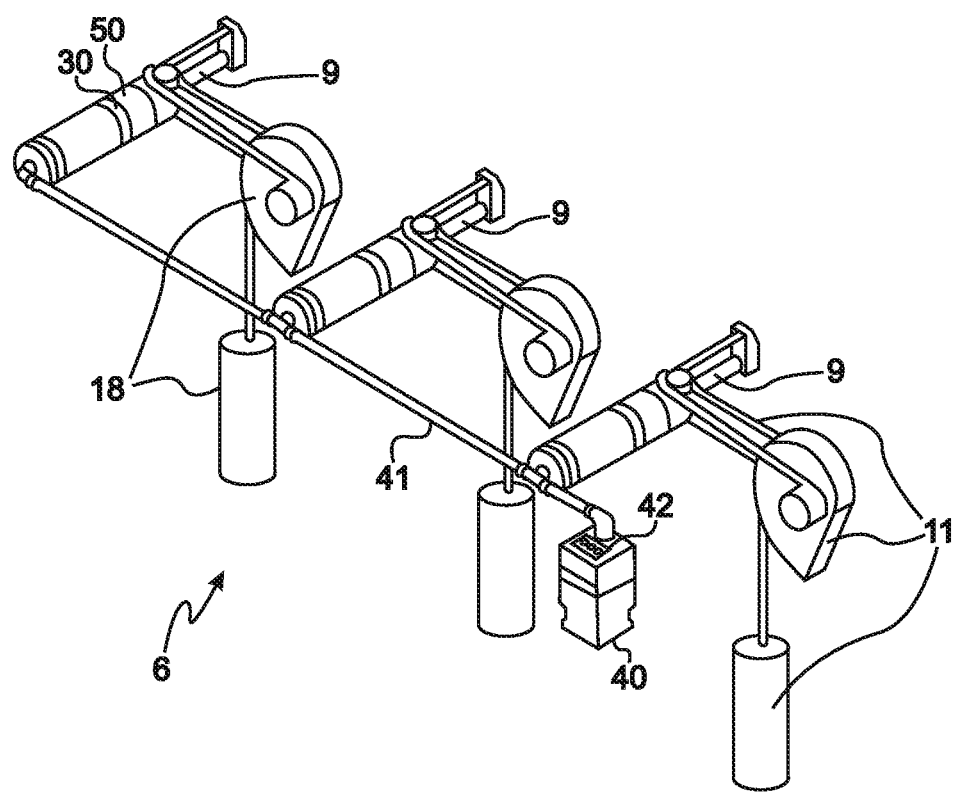
FIG. 10 shows a perspective view of a weighted cam biaser embodiment of a position control apparatus, of which an orifice(s) may form part, with pistons shown in solid line for clarity (orifices and part of positioner within cylinder not shown).
Figure 12A:
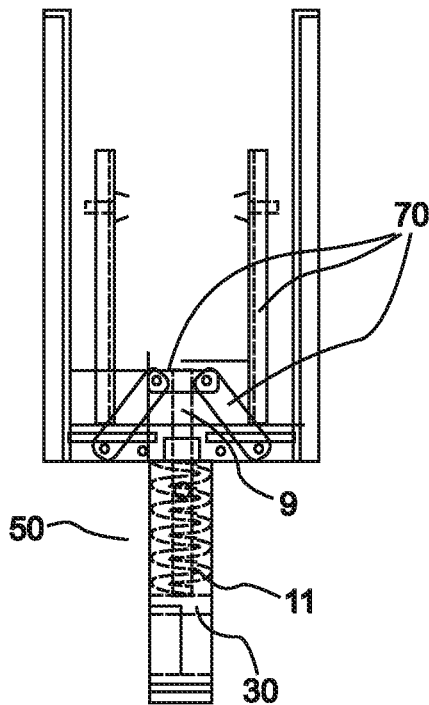
FIG. 12A shows a front view of linkage components of an embodiment of the position control apparatus, of which an orifice(s) may form part.
Figure 12B:
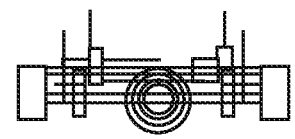
FIG. 12B shows a top view of linkage components of an embodiment of the position control apparatus.
Figure 12C:
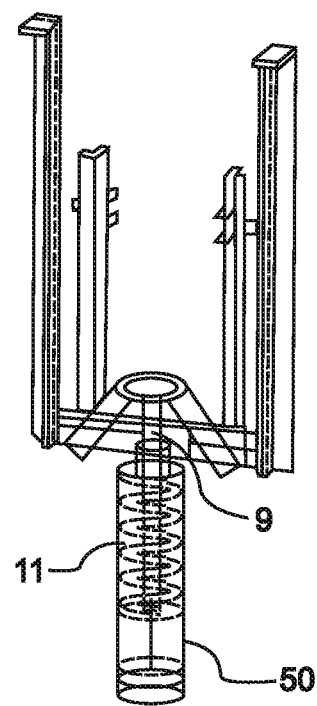
FIG. 12C shows a perspective view of linkage components of an embodiment of the position control apparatus.
Figure 12D:
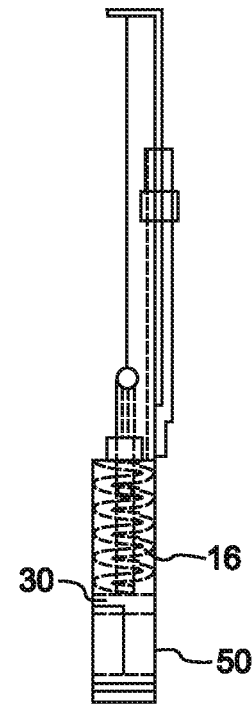
FIG. 12D shows a side view of linkage components of an embodiment of the position control apparatus (cylinder shown as transparent in FIGS. 12A, C and D).

The dynamic valve limits flow to a substantially constant rate at and beyond a certain flow threshold. It limits flow (to a constant, including no flow) above a certain critical flow value. For example, in a design where the threshold flow for the dynamic valve is 1 liter/minute, if, in a system that is identical but for an absence of the dynamic valve (a "flow unrestricted" system), the flow through the conduit, tube, port, etc. in which the dynamic valve would be established (in a system with the valve), is, e.g., 2 liters/min, 5 liters/min, 20 liters/min, etc. (anything above 1 liter/min), then, in a system with the dynamic valve (a "flow restricted" system), instead of flow through the valve (and through the conduit, tube, port, etc. it's established in) being that "above threshold" flow (e.g., 2, 5 or 20 liters/min), the flow would typically be limited to the constant value. In an orifice type dynamic valve, that constant value would be a non-zero constant (e.g., the threshold value); in a ball-type dynamic valve (see FIG. 4), that constant value would be zero.

As indicated, one of the problems that that embodiments of the inventive technology may solve is unacceptably large deflection of a component resulting from any impulse force acting on that component. Embodiments of the inventive technology may offer the advantage of making positioners (including but not limited to the longer stroke positioners) stiffer and more rigid in response to impulse forces encountered during apparatus operation, for impulse forces on, for example, the guide rails (e.g., side guide rails). This rigidity may manifest as a resistance to deflection. Certain embodiments may find use on systems that position based on a force balance between pressure acting on a piston and a biasing force that acts in an opposite direction (for the position to remain constant at the desired location/orientation, the two opposing forces must be equal). When an external force (impulse force) acts on the positioner (whether directly or indirectly), such as a heavy object hitting the component whose position is controlled by the positioner (at times the two may be the same thing), such force either supplements or subtracts from the bias force, depending on the direction of the impulse force and/or of the bias force.

In a flow unrestricted system (one without a dynamic valve to oppose impulse-induced motion of a positioner or component capable of receiving an impulse force), the amount of deflection caused by the disturbing impulse force may be proportional to the equivalent spring rate of whatever biasing force is used. For example, often a coil spring 16 is used. If the hypothetical spring rate is linear at 10 lbs per inch and an external, constant force of 1 lb is applied to that spring, then the resulting displacement would be 1/10 of an inch. In one type of standard application, external forces are not constant; they are generally short duration "Impulse Forces."

When a positioner in a flow unrestricted system experiences an impulse force there will be a temporary displacement until the force is removed and the deflected positioner returns to its original equilibrium position (flow restricted systems may also experience such motion, but to a lesser extent). The addition of a dynamic valve(s) provides a flow restricting effect to reduce motion, including displacement, from impulse forces. Typically, in certain embodiments, a volume has been created between the piston and the cylinder inside a positioner actuator (displacement volume 210); any fluid entering and exiting (if two dynamic valves per component capable of receiving an impulse force are used), or entering (on the one hand) or exiting (on the other hand) in the event one dynamic valve (per component capable of receiving the impulse force) is used during application of the impulse force will be restricted by the orifice, resulting in an opposition force that opposes and limits to some degree the motion (of the component) that would otherwise be caused (in a flow unrestricted system) by the impulse force. Resistance to displacement caused by the dynamic valve follows known, general dynamic valve fundamentals; fluid viscosity, density, fluid compressibility and impulse duration, as well as the type and flow restricting effect (e.g., orifice diameter) are all governing factors.

As mentioned, in preferred embodiments, the flow through the dynamic valve does not exceed the threshold (limiting) value. For the orifice version, as soon as flow reaches the threshold a shock wave may be created which prevents any additional flow from moving through the orifice (i.e., the flow is choked). On the mechanical version (the ball type dynamic valve), as soon as flow exceeds the threshold, the valve seals, stopping flow entirely until pressure reaches an equilibrium (or at least the differential is minimal enough for the elastic seal to return to its relaxed position). So, regardless of how high the flow would be in a system without the valve, in a system with a valve limits flow through the tube, conduit, port, etc. in which the valve is established to a constant value (non-zero in the event of an orifice; zero in the event of a ball-type dynamic valve).

In one exemplary system designed to allow an intentional change of position upon application (or reduction) of a force on the positioner (due to, e.g., increased or reduced internal pressurization on a piston), where flow (mass flow of fluid) into or out of the positioner actuator during such repositioning is from 0-10 gram/sec, then typically, in an inventive system, the dynamic valve would be selected so that its threshold value is substantially 10 grams/sec. Below such threshold flow, there would be, perhaps some restricting (e.g., dampening) of the flow caused by the valve, but substantially, the flow would be whatever the flow into or out of the positioner would be. However, at all flows above such threshold (flows which may be intentionally avoided during positioning of the positioner), the flow through the valve would be the same, i.e., constant (e.g., zero in the case of a ball type dynamic valve and non-zero (e.g., here, substantially 10 gram/sec) in the case of an orifice). Of course, excess flow (over the limit) that does not occur, is converted to pressure that in turn resists displacement in response to the impulse force.

More particularly as to the mechanics that applies during particular embodiments of the inventive technology, displacement of the positioner caused by the impulse force results in a change in volume in the positioner actuator. Initially this change in volume will result in flow through the dynamic valve until the rate of flow reaches the threshold value. Once the threshold value is reached the rate of flow through the valve remains constant. Because the rate of flow cannot "keep up" with the rate at which volume is changing due to the displacement the result is a pressure change within the volume contained. This in turn lowers the rate at which the volume changes, and decreases the motion (whether via decreasing its displacement and or changing its speed vs. time profile, such as reducing acceleration) of the positioner.

Expressed in mathematical terms:
T=0: Start Initial displacement
T=1: Displacement starts volume change, flow through valve begins.
Basic equation: Q1=Q2, When Velocity<M (mach) fluid is incompressible therefore: Q(Flow rate)= Velocity*Area
V1*A2=V2*A2, where V1=velocity of displacement, A1=area of piston face being displaced, V2=velocity through dynamic valve, A2=smallest area through dynamic valve
T=2: Threshold flow rate through dynamic valve is reached, flow is limited, pressure increases.

Note that the dynamic valve may behave, in certain configurations (e.g., the orifice type dynamic valve disclosed herein), as a damper below a certain value, but above will limit flow to a certain value (where without the valve, flow through the component in which the valve is established would otherwise increase above that value). Such limitation on the flow, typically seen during application of impulse force on the positioner, results in an increase in pressure in the positioner actuator that leads to opposition to displacement of the positioner. Indeed, the orifice type dynamic valve disclosed herein may effect choked flow at a certain value such that flows that would otherwise be at and above that value are instead limited to a constant value.

During positioning of certain positioners (e.g., a side guide positioner), the flow rate is very low (e.g., 1 ltr/minute) to effect the change in position of the positioner. At such time, displacement may be, e.g., 100 mm/min, and the dynamic valve poses virtually no (or very little) resistance to flow. However, when an impulse force is applied, flow stops or is severely reduced as compared to what it would otherwise be (i.e., without the dynamic valve), thereby preventing or reducing an unwanted displacement. In one exemplary embodiment, flow above 1 liter/min may cause the dynamic valve (whether orifice type or ball type, as but two examples) to severely restrict or even entirely block flow through the valve. With a properly sized orifice (e.g., below 1 mm in diameter in some applications), the restriction to flow posed by the orifice is negligible during positioning, but when the flow that would otherwise be seen increases by, e.g., an order of magnitude (as may be seen during application of certain impulse forces), flow through the component (e.g., port) in which the dynamic valve is established becomes choked flow (e.g., at just over the 1 Liter/min threshold).

Note that in many applications, the control pressure flow rate (i.e., used to reposition and hold the position of the positioner) is such that flow does not exceed the threshold value in any of the dynamic valves. When flow is low enough the flow restricting effect, while perhaps in effect, may be negligible, but typically, repositioning flows are not so low that the dynamic valve does not have some limiting, flow restricting effect.

More particularly as to a positioning system with an orifice type dynamic valve, consider the following example: an impulse of 100 mm/sec is applied for ½ sec. The exhaust flow (outflow) from the positioner actuator in response to such an impulse may be reduced to 100 mm/sec. Accordingly, the actual displacement of the positioner in response to this impulse would be 0.833 mm ((100 mm/min)(1 min/60 sec)(0.5 sec)=0.833 mm. For a typical low precision positioning application such as a side guide application (in a bottling conveyance system) for a positioner with a 100 mm stroke +/−3 mm repeatability, 0.833 mm displacement may be considered negligible.

Note that where the dynamic valve is the type that produces total flow blockage where the rate of impulse force application is above a certain value, there may be compression of the fluid in the positioner actuator (e.g., where the fluid is air), but typically the resulting displacement is still negligible. In systems where the impulse does not result in flow blockage (e.g., an orifice type dynamic valve where flow above a certain threshold value is limited to a non-zero constant), the exhaust flow (outflow from the cylinder), perhaps in combination with some fluid compressibility, also may result in negligible positioner displacement.

Note that examples of apparatus to which the inventive dynamic valve technology disclosed and claimed herein may be applied include but are not limited to any technology disclosed herein (including technology disclosed in the figures presented herein), and disclosed, whether via written description, drawings, claims or otherwise, in US 2009/0288725, U.S. Pat. No. 8,132,665, US 2012/0168284, and U.S. Pat. No. 9,133,865, each of which is incorporated herein by reference in its entirety.

A few advantages of the orifice type dynamic valve is that it has no moving parts, and is small and inexpensive. The disadvantage is that, to be effective against an impulse force, the orifice must be selected so that the threshold flow value is very low (this is because the orifice typically doesn't actually stop flow; it merely limits it to a low enough (typically the threshold) value such that displacement of the positioner is negligible. For a large positioner, this may result in positioning rates that are too slow. The mechanical dynamic valve (e.g., the ball type dynamic valve) has the advantage of stopping flow completely once the threshold is reached, so the threshold value could be set much higher and allow for faster positioning speeds.

The position control apparatus may effect positioning, as desired, of at least one component to a desired component position within the component position range. The component may be any capable of being controllably positioned (a term that also includes position within a linear range, within an angular range, and orientation in space within a range of various spatial orientations).

Impulse force induced motion of a component(s) capable of receiving an impulse force is any motion attributable to an impulse force; it may be prevented in whole or in part by the dynamic valve(s). A component (e.g., a side guide 15) capable of receiving an impulse force is positioned or oriented such that it can directly or indirectly receive an impulse force. Opposition to motion caused by that impulse force may effect a lower maximum amount of linear or angular deflection (or indeed, lower maximum change in orientation) than would otherwise be seen in response to such impulse force (i.e., in a flow unrestricted system without the dynamic valve(s)). Instead, or in addition, such opposition may effect a change in the speed vs. time profile of the component (as compared with that profile that would be seen in a system without such dynamic valve(s)). Typically, it is desired to limit, reduce and/or minimize that motion (e.g., by limiting or reducing its maximum deflection and/or by changing the speed vs. time profile by reducing its acceleration). The dynamic valve(s) may also enable the positioner 9 and the component whose position it controls to reset (to the desired, undisturbed position) sooner than would be seen in the flow unrestricted design.

The dynamic valve(s) create a degree (at times the majority, perhaps even the vast majority, such as more than 75%) of the total opposition to such motion (e.g., by entirely or significantly blocking or restricting fluid flow) that is sufficient to reduce the impulse force induced motion to a degree that is sufficient for the intended application (i.e., certain pre-existing system components such as vents, ports and/or biasers that might provide some opposition to impulse force induced motion are not considered dynamic valves; they alone do not limit flow like a dynamic valve does and do not by themselves provide sufficient opposition to impulse force-induced motion). Also, they may not allow for, e.g., reduction in internal steady state condition (see FIG. 2A) pressure and/or reduction in cylinder bore or piston size to achieve the desired opposition. Dynamic valves may assume characteristics/limitations as explained herein.

The entire force opposing impulse induced motion may be referred to as simply the opposition force, the total opposition force, the system opposition force, or the apparatus opposition force, e.g. Impulse force may include forces whose application is undesired but whose occurrence is acknowledged as possible (force caused by a foreign object in the conveyor line being moved against a side or neck guide, a mis-oriented bottle on the conveyor, and a worker jumping on the conveyor belt, as but a few examples), and perhaps even forces whose application is desired but that, if left unopposed, create an unacceptably large impulse force induced motion of the component, whatever it may be.

As suggested, the dynamic valve(s) may be an orifice dynamic valve 201, or a dynamic valve 204 (as but two of possibly several examples). Where it is an orifice dynamic valve, it may have an orifice diameter (or average width if not entirely circular) of from and including 0.5 mm to 0.1 mm, from and including 0.4 mm to 0.2 mm, and substantially 0.3 mm (as but a few examples), where substantially as used herein means within (and including) 10% more than or less than the indicated value. Regardless of what type of dynamic valve is used, the dynamic valve intentionally generates an increase in the internal pressure, and thereby creates or helps to create a sufficiently large apparatus or system opposition force 205 (as explained above). Typically, in standard fluid driven positioners having a piston within a cylinder 51, the orifice dynamic valve associated with that actuator has a cross-sectional area (area that is orthogonal to the flow through it) that is less than $\frac{1}{2500}^{th}$ the face are of the piston. Note also that it may be possible to fashion a type of dynamic valve from two of the valves invented by Tesla as disclosed in U.S. Pat. No. 1,329,559.

Note that generally, a dynamic valve may be any component or device causing a substantially constant flow through the valve when the flow reaches a certain value (a threshold value), as when there is an impulse regardless of how high above that value the flow would otherwise be (i.e., in the absence of the valve). The ball type dynamic valve uses elastic fingers that permit flow around the valve's ball in low flow conditions; with higher flow rates they may deform causing the ball to seal. Note that it is not required that, at higher flows, all flow is terminated. Indeed, typically, at very high flows, an orifice type dynamic valve still allows some amount of flow through it; however, as explained elsewhere herein, an orifice may need to have a lower threshold value as compared with a ball-type dynamic valve.

The component(s) capable of receiving an impulse force may be part of item conveyance componentry such as a conveyor belt drum, conveyor belt idler, conveyor belt pulley, conveyor belt bearing, conveyor belt, conveyor belt support, conveyor belt rollers; conveyor belt tension device, a conveyor belt component, side guide component, neck guide component, bottle positioning component, and solar panel, solar panel tracking positioner system component, pneumatic tensioning and pressure applicators used in gripper belts, pneumatic tensioners in a chain driven lift, at least one side guide component (which is part of an item conveyance system), and pallet-related system, in addition to any systems mentioned in U.S. Pat. No. 8,132,665, as but a few examples. Pneumatic tensioners in a chain driven lift maintain constant pressure on the chain as it lifts an object. If a person jumps on the lift or something else causes an impulse force, it can cause the tensioners to retract, allowing the chain to become loose enough long enough to skip on the drive sprocket. For a gripper belt, pneumatic cylinders are used to keep steady pressure on the grippers that hold a variety of objects. A large impulse force can cause the grippers to move out and dozens of products to fall out of the grippers.

Note that the use of a dynamic valve may generate cost savings (during manufacture and/or operation) in that it may allow either or both of the following: a reduced internal pressure to achieve the same (total/system/apparatus) opposition force as observed in a flow unrestricted system (such reduced pressure may allow for less expensive plumbing and a less expensive, smaller pump or compressor, e.g.); and a smaller positioner actuator (e.g., a smaller diameter actuator cylinder as compared to that cylinder size required in a flow unrestricted system), leading to reduced actuator costs. Employing the former cost saving measure in higher pressure systems may achieve the greatest cost savings while employing the latter in lower pressure systems may achieve the greatest cost savings, but this is not a hard and fast rule.

Size reduction of cylinders (of actuators) and/or reduction in internal pressure may be particularly appropriate where positioner motion during steady state (see, e.g., FIG. 2A) operation (where, e.g., the force on the positioner is, substantially, simply the static weight of the component being positioned and opposing forces on any piston are balanced) does not pose a safety risk. Indeed, at times the extra cost of using a larger bore fluidic positioner (sized for a flow unrestricted system) or the higher cost associated with the higher (flow unrestricted) system pressure could not be justified for any safety considerations. Examples of situations where such is not justified include but are not limited to many conveyance systems applications such a side guide positioners (in an item, such as bottle, conveyance system), and solar panel positioners. At times, it may be that, e.g., a larger positioner actuator (and/or a higher pressure), perhaps as seen in flow unrestricted systems, is required because it is necessary to preclude the motion that would be seen in a flow restricted system (i.e., one with at least one dynamic valve established as disclosed herein) during steady state operation (undisturbed condition) and/or during impulse force application, because such motion may pose a safety concern (an example may be certain critical airplane flap or aileron position control applications). Non-critical applications with flow restriction may be well suited for cost savings, whether via, e.g., pressure reduction (leading to less expensive pressurized componentry, less air consumption, and/or lower pump costs and requirements), or smaller sized positioner actuators (e.g., smaller cylinders in piston-based actuators).

As an example as to higher pressure systems regarding achieving the same opposition to impulse force induced motion, it might be less expensive to use the same size positioner actuator (as compared with the flow unrestricted system) but reduce pressure to achieve the significant savings associated with the a lower pressure system [e.g., low pressure (under 100 psi) 2" diameter positioners that could be plumbed with inexpensive flexible poly tubing would be far less expensive than a hydraulic system utilizing 1" bore positioners and high pressure metal plumbing). Indeed combinations of a lower pressure and a smaller actuator may be employed at times. At times, the primary consideration might not be cost savings, as indeed a smaller positioner could simplify certain applications, or even allow applications in tight spaces that would not otherwise by practical or might require attachment componentry such as clamps, etc. (which also can be expensive). Note that both—lower internal pressure and smaller actuator size—are flow restricted system configurations; they are typically less expensive than their corollary flow unrestricted system configuration that is required to achieve the same opposition force. It is also of note that, as used herein, the term "flow restricted" indicates the presence of a dynamic valve situated so as to product an opposition force to an impulse force; the term "flow unrestricted" indicates the absence of such a valve. The term flow unrestricted is used even though, in a system so characterized, there may still be other components that do restrict flow (e.g., a port's small size, a rough inner surface of a conduit).

The dynamic valve(s) may be configured to oppose motion of the at least one component induced by the impulse force, and the system/apparatus may respond to impulse forces with an opposition force (perhaps referred to as a total, apparatus, or system opposition force). Note that the internal fluidic pressure may be described as an undisturbed (i.e., steady state, or not subject to impulse force at that time), flow restricted system internal pressure that is less than the undisturbed, flow unrestricted system internal pressure that, in a system without the at least one dynamic valve, is required to provide an identical opposition force to oppose the impulse force induced motion of the component capable of receiving an impulse force (e.g., at least one side guide component). Indeed, this points to one of the major advantages of certain embodiments of the inventive technology—in the flow restricted system, a lower pressure may be used to achieve the same opposition force (to impulse induced motion) as compared with that pressure required in an flow unrestricted system. Such lower pressure may result in, e.g., fewer leaks, less energy costs, and less expensive equipment.

Note that the undisturbed, flow unrestricted internal pressure may be greater than the undisturbed, flow restricted system internal pressure by at least 25%, at least 50%, at least 75%, at least 100%, or at least 200%. Expressed another way, in a system without the at least one dynamic valve (a flow unrestricted system), in order to achieve the same opposition force, a drive system of the flow unrestricted system would require an undisturbed, flow unrestricted system internal pressure that is selected from the group consisting of: greater than 125%, 150%, 175%, 200%, 300%, the undisturbed, flow restricted system internal pressure required to achieve that opposition force. In any description, it is of note, and perhaps obvious, that the opposition force varies depending on the impulse force.

In embodiments with positioner actuators 50, the actuator size may be a flow restricted system actuator size that is smaller than the flow unrestricted system actuator size required to achieve the same opposition force. Comparative sizes (e.g, of the diameter of the bore of a cylinder 51 of a cylinder type actuator) may be, e.g., less than 90%, less than 80%, less than 75%, less than 70%, less than 60%, less than 50% and less than 40% of the flow unrestricted system size. Of course, at times, the greatest savings may be achieved by instead lowering the pressure (particularly in high pressure applications). Lower applications such as bottle conveyance systems may find greater cost savings achieved where the actuator size is reduced. Essentially in flow restricted systems, as compared with flow unrestricted systems, in order to achieve the same opposition force (to impulse force and the undesired motion they may cause), the resisting force caused by the dynamic valve allows a smaller diameter piston and/or a lower steady state (undisturbed condition) pressure. It is well known that a smaller diameter piston (while keeping pressure the same) exerts a lower force than does a larger piston, and a lower pressure (while keeping piston size the same) exerts a lower force than does a higher pressure. However, where a system has a dynamic valve configured to oppose the impulse force (and the motion it might otherwise cause), the dynamic valve contributes to a system/apparatus opposition force that is generated when the impulse is applied, and one can use the smaller piston and/or lower pressure while still achieving the same opposition force.

More particularly as to solar panel tracking positioners (or more generally, higher pressure applications), which are often hydraulic, using the dynamic valve technology disclosed herein allows considerable cost savings by allowing for a design that uses a much lower pressure, resulting in a less costly hydraulic pump and lines to each positioner. In application, and understanding that wind loads (in solar panel system design) assume gusts (which are impulse forces) many times the steady wind load, and that typically positioning during a gust is not necessary, with the dynamic valve technology disclosed herein, the positioner (and the panel whose position is controlled thereby) would hold its position during the gust then allow for a continuance of positioning the panel once the gust stopped. As with any impulse force, typically this force (gust of wind) is the exception (i.e., the majority, or perhaps even vast majority of the operational time, the system is in an undisturbed condition).

Note that the position control apparatus (i.e., that controls the position of at least one component capable of receiving an impulse force) typically controls the position of a positioner (note that this positioner may be the component capable of directly receiving the impulse force, or it might be attached (connect via screws and/or linkages, e.g.) to that component). Where there are linkages between the positioner and the component capable of receiving the impulse force, and the movement of the positioner and such component are not identical (e.g., linkages magnify the movement of the component capable of receiving the impulse force), then the position control apparatus is still the to control the position of that component.

The system may comprise at least one, or at least two, or more, dynamic valve(s) for each of the at least one component capable of receiving an impulse force (e.g., a side guide component). Where there are at least two dynamic valves for each such component capable of receiving an impulse force, at least one dynamic valve may be established to restrict fluid outflow (actuator fluid exhaust, which is, of course, fluid ejected from an actuator) during a single impulse event, and at least one other dynamic valve may established to restrict fluid inflow (e.g., from an actuator) during that single impulse event. In certain systems, there may be fewer dynamic valves than are components capable of receiving an impulse force.

It is of note that where there is a need to reduce motion only in one direction (perhaps because the anticipated impulse acts only in one known direction), where, during application of the impulse force, fluid flows into (not out of) a cylinder, and where establishing a dynamic valve in such manner would appear to result in opposition force to motion induced by that impulse force, then, for certain applications, either that dynamic valve will not be used (and instead a dynamic valve to restrict fluid outflow will be used), or it will be used only in conjunction with a dynamic valve established to restrict fluid outflow. Because there is a low upper limit (of 1 ATM) on the opposition force provided by an "inflow-restricting" dynamic valve (the force does not increase beyond this limit, with an increase in the magnitude of the impulse force), if such dynamic valve is the only dynamic valve used for that actuator, in certain applications, that amount of opposition force may be insufficient (however, in a few applications it may be sufficient) so, at times, it may be acceptable to use a single dynamic valve in a port through which air inflows (into a cylinder) during application of an anticipated impulse force. Perhaps in certain applications the sufficient opposition force is effected only upon the use of two dynamic valves (e.g., one restricting actuator fluid outflow and the other restricting actuator fluid inflow to provide a supplemental force to the other dynamic valve).

Note that in any of the various embodiments of the inventive technology with a position control apparatus, such apparatus may include at least one cylinder and piston (forming at least a part of the fluidic drive system, which may also include, e.g., pressurized lines and a compressor) as described in U.S. Pat. No. 8,132,665. The position control apparatus may include at least one biaser acting against the internal fluidic pressure (also as described in U.S. Pat. No. 8,132,665). Internal fluidic pressure may be pneumatic pressure or hydraulic pressure, as but two examples. In embodiments with a fluidic drive system that includes fluid at an internal fluidic pressure, when the system is undisturbed, such pressure may be referred to as a low fluidic pressure because it is lower than it would need to be in a flow unrestricted system to achieve the same desired opposition to impulse force.

At least one embodiment of the inventive technology may be described as a position control apparatus capable of moving at least one side guide component of an item conveyance system to any of a plurality of component positions, as desired, within a component position range.

This apparatus may (as indeed may an apparatus disclosed herein) comprise a fluidic drive system 7 configured to drive, with a single fluidic displacement (via, e.g., positioner actuators fluidicly linked in parallel), a plurality of positioners (and the components such as side guide components, they are connected to) in a first relative direction 10; and a bias system that includes a plurality of biasers 11 that bias the positioners in a direction 12 that is opposite the first relative direction; the apparatus enabling adjustment of the positioners (and the side guide components) to a plurality of positions within a positioner range. Such apparatus may be as described in U.S. Pat. No. 8,132,665, which is incorporated herein in its entirety. The inventive apparatus may further comprise at least one dynamic valve configured to oppose impulse force induced motion of the at least one side guide component.

In any embodiment with a fluidic system, such fluidic system may comprise a plurality of positioner actuators (as disclosed via example in U.S. Pat. No. 8,132,665). There may be one or more dynamic valves for each side guide component. Where there are two or more dynamic valves for each of a majority (i.e., from more than half to including all) of the side guide components, each may be established to restrict actuator fluid flow during a single impulse event. One of the two dynamic valves may be established to restrict actuator fluid outflow during a single impulse event and the other of the two dynamic valves may be established to restrict actuator fluid inflow during the single impulse event. Where a positioner actuator includes a control pressure port 202 and a vent 203, one of the two dynamic valves associated with the side guide component may be established within the control pressure port and the other of the two dynamic valves may be established within the vent.

Now taking a closer look at the figures: FIGS. 1A-1D shows various orifice applications (internal spring actuators). Generally, in such positioner control apparatus, the orifice can be installed on either the control pressure port, vent port or both. Various design applications may dictate on which ports the orifice will provide the most benefit. For example, many applications have the orifice on the control pressure port since many positioner applications are such that any impulse force on a guide rail will compress the cylinder and reduce the volume fed by the control pressure. In such design, the dynamic valve (here, an orifice type dynamic valve) restricts fluidic expulsion from or displacement out of this volume, resulting in a pressure increase within the control volume, thereby resulting in a system/apparatus that generates an opposition force in opposition to the impulse force. The portion of that opposition force attributable to the dynamic valve may increase exponentially with a linear increase in the displacement volume. While a second orifice installed on the vent side of the positioner does aid somewhat in the opposition of impulse force by restricting air entering into actuator (here, on the opposite side of the cylinder) as intake air, the effect is limited to the pressure of 1 ATM. Generally the dual orifice application would be particularly suited to arrangements where there could be an impulse force in both directions, although this is certainly not the only application of the dual dynamic valve technology.

FIG. 1A shows a "push" design, where the anticipated impulse force would push the piston down (with the bias force) and decrease the displacement volume on the control side of the piston (i.e., below the piston in this figure), with a resultant expulsion (pushing) of air through the control pressure port, which is the port at the lower portion of the figure (and the orifice type dynamic valve within it). Note that this could also be a pull design (or even a push/pull design), although it may be that because the only dynamic valve in this system would restrict intake air during application of the pull impulse force (such that the opposition force generated by the dynamic valve alone would be limited to 1 ATM), the total opposition force might not be sufficient for the purposes of the application. Where it would be, FIG. 1A could show a "pull" design, or a "push/pull" design. The horizontal lines at the two ports (the upper port is a vent) of the figure show the possible direction of fluid flow (occurring, e.g., during changing of position of the positioner, or during receipt of an impulse force); in this figure, the upper port is a vent and the lower port is a control pressure port. In a steady state condition, the fluid above the piston is at atmospheric pressure; the fluid below is at an increased, control pressure. Note that the fluid above and below the piston need not be the same, but often is (e.g., often, it is air).

FIG. 1B shows a "push/pull" design where the anticipated impulse force could cause the piston to move up or down, resulting in either a suction (intake) of air through one port and an expulsion of air through the other, or vice versa. For example, where the impulse force acts to move the positioner away from the actuator (i.e., the piston moves up), one would see intake of air through the control pressure port and expulsion of air through the vent (exposed to atmospheric pressure). In either impulse, there is an expulsion of contained fluid through an orifice (supplemented by suction of fluid into the actuator through a different orifice), resulting in an opposition force that is sufficient for the application.

FIG. 1C shows a "pull" design where the anticipated impulse force would cause the positioner to move away from the actuator, and the piston to move up, causing the displacement volume above the piston to expel air through the control pressure port and the orifice in it. Note that this could also be a push design, although it may be that because the only dynamic valve in this system would restrict intake air during application of the impulse force (such that the opposition force would be limited to 1 ATM), the total opposition force might not be sufficient for the purposes of the application.

FIG. 1D shows a "push/pull" design where the anticipated impulse force could cause the piston to move up or down, resulting in either a suction (intake) of air through one port and an expulsion of air through the other or vice versa. For example, where the impulse force acts to move the positioner towards the actuator (i.e., the piston moves down), one would see intake of air through the control pressure port and expulsion of air through the vent (exposed to atmospheric pressure), and the orifices in them.

FIGS. 2A and 2B show how the orifice arrangement resists deflection from impulse forces in a common position control apparatus (the standard "Anysize" configuration, as the patentee refers it). FIG. 2A shows undisturbed condition while FIG. 2B shows disturbed condition (only FIG. 2B shows a side guide for clarity reasons; both figures are of the same apparatus. As to operation during standard steady state condition (undisturbed condition), forces are balanced and pressure within the cylinder volume and control fluid infeed are the same. When, during disturbed or impulse condition, the positioner is subjected to an impulse force (downward in this scenario, such that the displacement volume decreases), pressure increases within the displacement (cylinder) volume as the fluid is forced out of the orifice (see FIG. 2B). This of course restricts or limits deflection of the piston, the increased pressure acting as a force in the direction opposite of the deflection (impulse) force, resulting in reduced or minimal displacement 240 of the positioner.

FIGS. 3A and 3B show what a typical orifice application looks like as applied to an "external" biaser design (indeed, the dynamic valve technology can be applied regardless of where any biasers are established relative to any cylinder that may be part of the inventive technology). FIGS. 3A and 3B show different views of a standard case "Anysize" positioner (as referred to by the patentee), with the dynamic valve (here an orifice) installed on the control fluid input fitting. FIG. 3A shows front (transparent) view while FIG. 3B shows a side (transparent) view. Note that the bias force is effected by springs in tension (it is downward on the positioner) while the pressure caused in the displacement volume (below the piston, on the side of the piston that is at the control pressure) by the control pressure is in the opposite direction (upwards).

In certain piston-containing designs, appropriate selection of where to establish the dynamic valve (i.e., on which side of the piston), may be important to achieve the greatest opposition to impulse force. Typically, in one dynamic valve per actuator designs, it is preferred to place the dynamic valve on the side of the piston whose volume will be decreasing when the impulse force is applied such that air expelled from the cylinder during application of such impulse force will pass through the dynamic valve (instead of having air suctioned into the cylinder passing through the dynamic valve). This is because typically, the greatest opposition force (in response to the impulse force) results from expelling air from the cylinder through the dynamic valve (instead of intaking air into the cylinder through the dynamic valve).

For certain standard positioner control apparatus, where the positioner shaft is usually extended out (away from the cylinder) from its unpressurized, default position in order to reach its steady state operating position, the anticipated impulse force may often be unidirectional and may often act in an opposite direction to retract the shaft and piston, pulling air in from the vent side as the piston moves back (see, e.g., FIG. 1A). If there were a dynamic valve (e.g., orifice) on the vent side only, then a vacuum would be pulled upon application of the impulse. However, an opposition force caused by such an orifice would be limited to 1 ATM (which is generally relatively low and often (but not always) insufficient for the intended application). For this reason, it makes better design sense to put the dynamic valve on the opposite, control pressure side, where the orifice restricts flow of fluid (e.g., air) that is being expelled from the cylinder upon application of the impulse force. There is virtually no limit (other than that imposed by the cylinder walls and other componentry, such as the dynamic valve) to the pressure force within the volume, and thus virtually no limit to the magnitude of the opposition force. If desired, as shown in FIG. 1B, a second dynamic valve can be added to the vent, therby supplementing the opposition force effected by the dynamic valve in the control pressure port (see FIG. 1B, which shows a design that can also be used in a "push-pull" scenario).

Accordingly, as mentioned, a controlling consideration in design in certain piston containing embodiments may be to locate the dynamic valve such that whenever an anticipated impulse force occurs, the air expelled from a cylinder (e.g., a piston containing cylinder) is forced through the dynamic valve (negative piston displacement). Such dynamic valve location will provide the greater opposition to the impulse force. Any additional dynamic valve providing restriction to air taken into the cylinder during application of the impulse force (positive piston displacement), while limited (to 1 ATM, regardless of whether the air is suctioned through a vent port open to 1 ATM or to a control pressure port with a control pressure behind it), may provide supplemental (but less by comparison) opposition force.

As mentioned, the dynamic valve is used to limit travel against impulse forces. In certain embodiments, two (or more) pneumatic cylinders may be plumbed in series for adjusting components such as neck guides. It is desired to set the pressure controlling these as low as possible to minimize leaks and air consumption, inter alia. In this arrangement, the volume contained in all the cylinders and plumbing can be quite large—maybe 100× the volume of a single cylinder. Accordingly, an impulse force affecting a single cylinder, typically greater than the force imparted by the control pressure against the piston in the cylinder, can cause the cylinder will temporarily retract because the pressure increase from a brief, e.g., 1% reduction in volume (of the cylinders and plumbing) is negligible. If an orifice is installed on each cylinder the effect is one of effectively limiting the volume of air compressed during an impulse force to just that contained in the single cylinder being impacted. Rather than just retract, if a great enough impulse force impacts a low pressure cylinder, the pressure inside that cylinder will increase as the volume decreases and continue to increase exponentially to resist the impulse. As such, the retraction that would otherwise be seen can be reduced, perhaps significantly, or even eliminated (practically) entirely.

The inventive technology may include corollary method claims. The inventive methods, in particular embodiments, may be described as follows: a method for reducing the magnitude of a required steady state internal pressure in a component positioning system comprising the steps of internally pressurizing componentry of a position control apparatus, the position control apparatus comprising a positioner actuator configured to control the position of at least one component capable of receiving an impulse force; and establishing a dynamic valve so as to produce an opposition force that opposes impulse force induced motion of the at least one component capable of receiving an impulse force. In particular embodiments, the step of internally pressurizing componentry of a position control apparatus may comprises the step of internally pressurizing componentry at a flow restricted system internal pressure that is lower than the flow unrestricted system internal pressure that would be required to achieve the opposition force. Also, or instead, in certain embodiments, the positioner actuator may have a flow restricted system actuator size that is smaller than the flow unrestricted system actuator size that would be required to achieve the opposition force.

Yet another way in which various embodiments of the inventive method technology may be described is as follows: a method for saving costs associated with a position control apparatus comprising the steps of: internally pressurizing componentry of a position control apparatus, the position control apparatus comprising a positioner actuator configured to control the position of at least one component capable of receiving an impulse force; and establishing a dynamic valve so as to produce an opposition force that opposes impulse force induced motion of the at least one component capable of receiving an impulse force, wherein the position control apparatus comprises a flow restricted system configuration that is preferred relative to a flow unrestricted system configuration required to achieve the opposition force. The flow restricted system configuration itself may be described as a flow restricted system internal pressure that is lower than the flow unrestricted system internal pressure that would be required to achieve the opposition force or a flow restricted system actuator size that is smaller than the flow unrestricted system actuator size that would be required to achieve the opposition force.

Another method type aspect of the inventive technology may be described as a method for reducing impulse force induced motion of a component capable of receiving an impulse force and whose position is controlled by a position control apparatus comprising the steps of: internally pressurizing componentry of a position control apparatus, said position control apparatus comprising a positioner actuator configured to control the position of at least one component capable of receiving an impulse force; and establishing a dynamic valve in a flow component so as to produce an opposition force that opposes impulse force induced motion of said at least one component capable of receiving an impulse force; receiving an impulse force onto said at least one component capable of receiving an impulse force; and limiting flow through said flow component to constant value, wherein said constant value is selected from the group consisting of non-zero value and zero. The method further comprises the step of reducing impulse force induced motion of said component capable of receiving an impulse force (where the reduction is compared to the reduction that would be seen when an identical impulse force is applied to an apparatus that is identical but for its absence of the dynamic valve). In the event the dynamic valve is an orifice dynamic valve, then the constant value may be non-zero; if instead the valve is a ball type dynamic valve, then the constant value may be zero.

Note that all embodiments of the inventive method technology may include features and limitations as expressed elsewhere herein (whether expressly or via incorporation by reference). For example, the position control apparatus may comprise a fluidic drive system configured to drive, with a single fluidic displacement, a plurality of positioners in a first relative direction, and also a bias system that includes a plurality of baisers that bias the positioners in a direction that is opposite the first relative direction. Note that particular embodiments of the inventive technology may increase the rigidity of an internally pressurized positioner system to impulse forces.

Note that examples of systems and apparatus to which the new dynamic valve technology, in any of its various embodiments, may find application include but are not limited to US 2009/0288725, U.S. Pat. No. 8,132,665, US 2012/0168284, and U.S. Pat. No. 9,133,865, each of which is incorporated herein by reference in its entirety. Such documents may describe certain components and steps of any of the various systems, apparatus and methods claimed herein, whether via text, drawings or other.

As can be easily understood from the foregoing, the basic concepts of the present invention may be embodied in a variety of ways. It involves both impact-effected disturbance mitigation techniques as well as devices to accomplish the appropriate mitigation. In this application, the mitigation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "restrictor" should be understood to encompass disclosure of the act of "restricting"—whether explicitly discussed or not—and, conversely, were there effectively disclosure of the act of "restricting", such a disclosure should be understood to encompass disclosure of a "restrictor" and even a "means for restricting" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the positioning and flow restricting devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A position control apparatus capable of moving at least one side guide component of an item conveyance system to any of a plurality of component positions, as desired, within a component position range, said apparatus comprising:
    a fluidic drive system configured to drive, with a single fluidic displacement, at least one side guide positioner in a first relative direction;
    a bias system that includes at least one biaser that biases said at least one side guide positioner in a direction that is opposite said first relative direction; and
    wherein said fluidic drive system comprises a positioner actuator connected in parallel with at least one other positioner actuator, each said positioner actuator comprising at least one flow orifice functioning as a dynamic valve configured to oppose impulse force induced motion of said at least one side guide positioner;
    wherein said apparatus enables adjustment of said at least one side guide positioner to a plurality of positions within a side guide positioner range, said side guide positioner effecting positioning, as desired, of said at least one side guide component to a desired component position within said component position range.

2. A position control apparatus as described in claim 1 wherein said at least one flow orifice is selected from the group consisting of at least one flow orifice having an orifice diameter of from and including 0.5 mm to 0.1 mm, at least one flow orifice having an orifice diameter of from and including 0.4 mm to 0.2 mm, and substantially 0.3 mm.

3. A position control apparatus as described in claim 1 wherein said at least one flow orifice comprises a dynamic valve configured to restrict positioner actuator flow.

4. A position control apparatus as described in claim 3 wherein said at least one dynamic valve comprises a flow orifice configured to restrict flow out of at least one of said positioner actuators.

5. A position control apparatus as described in claim 3 wherein said at least one dynamic valve comprises a flow orifice configured to restrict flow into at least one of said positioner actuators.

6. A position control apparatus as described in claim 1 wherein said at least one flow orifice is configured to oppose impulse force induced motion of said at least one side guide component with an opposition force.

7. A position control apparatus as described in claim 6 wherein at least one of said positioner actuators has a flow restricted system actuator size that is smaller than a flow unrestricted system actuator size that would be required to achieve said opposition force.

8. A position control apparatus as described in claim 1 wherein said at least one flow orifice comprises at least one flow orifice for each of at least one of said positioner actuators.

9. A position control apparatus as described in claim 1 wherein said at least one flow orifice comprises two flow orifices for each of a majority of said at least one side guide positioner.

10. A position control apparatus as described in claim 9 wherein each of said two flow orifice is established to restrict actuator fluid flow during a single impulse event.

11. A position control apparatus as described in claim 10 wherein one of said two flow orifices is established to restrict actuator fluid outflow during a single impulse event and the other of said two flow orifices is established to restrict actuator fluid inflow during said single impulse event.

12. A position control apparatus as described in claim 1 wherein each of said positioner actuators comprises a control pressure port and a vent.

13. A position control apparatus as described in claim 12 wherein said at least one flow orifice comprise two flow orifices, and one of said two flow orifices is established within said control pressure port and the other of said two flow orifices is established within said vent.

14. A position control apparatus as described in claim 1 wherein said at least one flow orifice configured to oppose impulse force induced motion of said at least one side guide positioner is established within said control pressure port or within said vent.

15. A position control apparatus as described in claim 14 wherein said position control apparatus comprises two flow orifices for each of a majority of said at least one side guide component.

16. A position control apparatus as described in claim 15 wherein, during a single impulse event, one of said at least two flow orifices restricts positioner actuator fluid outflow and a different one of said at least two flow orifices restricts positioner actuator fluid inflow.

17. A position control apparatus as described in claim 1 wherein said at least one flow orifice comprises a ball type dynamic valve.

* * * * *